(12) United States Patent
Jibbe et al.

(10) Patent No.: US 8,984,225 B2
(45) Date of Patent: Mar. 17, 2015

(54) METHOD TO IMPROVE THE PERFORMANCE OF A READ AHEAD CACHE PROCESS IN A STORAGE ARRAY

(75) Inventors: Mahmoud K. Jibbe, Wichita, KS (US); Manjunath Balgatte Gangadharan, Karnataka (IN); Chandan A. Marathe, Karnataka (IN); Natesh Somanna, Karnataka (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 933 days.

(21) Appl. No.: 13/166,146

(22) Filed: Jun. 22, 2011

(65) Prior Publication Data
US 2012/0331222 A1 Dec. 27, 2012

(51) Int. Cl.
*G06F 12/08* (2006.01)
(52) U.S. Cl.
CPC ........ *G06F 12/0868* (2013.01); *G06F 12/0897* (2013.01); *G06F 2212/217* (2013.01)
USPC .... 711/117; 711/113; 711/114; 711/E12.103; 711/E12.08
(58) Field of Classification Search
CPC ............ G06F 12/0804; G06F 12/0888; G06F 12/0868; G06F 12/0897
USPC ............ 711/162, 112, 113, 114, E12.08, 117, 711/E12.103
See application file for complete search history.

(56) References Cited

U.S. PATENT DOCUMENTS

| | | | |
|---|---|---|---|
| 5,805,787 A * | 9/1998 | Brant et al. | 711/114 |
| 5,860,083 A | 1/1999 | Sukegawa | 711/103 |
| 6,467,022 B1 | 10/2002 | Buckland et al. | 711/113 |
| 7,107,343 B2 | 9/2006 | Rinaldis et al. | 709/225 |
| 7,136,966 B2 * | 11/2006 | Hetrick | 711/122 |
| 8,321,630 B1 * | 11/2012 | Vaid et al. | 711/114 |
| 2008/0215810 A1 * | 9/2008 | Yamada et al. | 711/114 |
| 2009/0210620 A1 | 8/2009 | Jibbe et al. | 711/114 |
| 2010/0100664 A1 | 4/2010 | Shimozono | 711/103 |
| 2010/0106905 A1 | 4/2010 | Kurashige et al. | 711/114 |
| 2010/0146068 A1 | 6/2010 | Haviv | 709/212 |
| 2010/0211731 A1 | 8/2010 | Mittendorff et al. | 711/113 |
| 2010/0228799 A1 | 9/2010 | Hutton et al. | 707/822 |
| 2010/0274962 A1 * | 10/2010 | Mosek et al. | 711/113 |
| 2010/0281207 A1 | 11/2010 | Miller et al. | 711/103 |
| 2010/0318734 A1 | 12/2010 | Vaid et al. | 711/113 |
| 2010/0325379 A1 | 12/2010 | Eguchi et al. | 711/165 |
| 2011/0022794 A1 | 1/2011 | Jibbe et al. | 711/113 |
| 2011/0035409 A1 | 2/2011 | Shimada et al. | 707/783 |
| 2011/0138113 A1 | 6/2011 | Leach et al. | 711/103 |

* cited by examiner

*Primary Examiner* — Pierre-Michel Bataille
(74) *Attorney, Agent, or Firm* — Christopher P. Maiorana, PC

(57) ABSTRACT

An apparatus comprising an array controller and a cache. The array controller may be configured to read/write data to a first array of drives of a first drive type in response to one or more input/output requests. The cache may be configured to (i) receive said input/output requests from the array controller, (ii) temporarily store the input/output requests, and (iii) read/write data to a second array of drives of a second drive type in response to the input/output requests. The first array of drives may be configured to copy the data directly to/from the second array of drives during a cache miss condition such that the array controller retrieves the data stored in the first array of drives through the second array of drives without writing the data to the cache.

20 Claims, 5 Drawing Sheets

METHOD TO IMPROVE THE PERFORMANCE OF A READ AHEAD CACHE PROCESS IN A STORAGE ARRAY

FIELD OF THE INVENTION

The present invention relates to data storage generally and, more particularly, to a method and/or apparatus to improve the performance of a read ahead cache process in a storage array.

BACKGROUND OF THE INVENTION

In conventional data storage scenarios, particularly in cloud computing and storage, large amounts of data are available that need to be read regularly. In video streaming, social networking websites, wiki pages, bank data, medical imagery storage, etc., an enormous amount of data is read daily. The main aim of storage solutions is to ensure performance. Compromises made for each of the storage redundancy schemes reduces performance. In recent years, caching of data has been widely used to improve the performance of the system. In some conventional systems, read and write data is kept in a cache, so that further read operations can be quickly serviced to a host.

In conventional flash read cache approaches, data is present in the cache, and host input/output requests are serviced immediately. If a cache miss occurs, then the controller searches for the data in an SSD volume. If the data is present in the SSD volume, the requested data is sent to the host. If the data is not in the SSD volume, then the starting logical block addresses (LBAs) are read again from the drive volume and a write operation is performed on a solid state disk volume. The corresponding bitmap in the metadata is updated to indicate that the LBAs are present. This ensures that further read operation on the set of these LBAs are serviced directly from the SSD (i.e., flash) volume rather than the HDD (i.e., fixed) volumes to improve performance.

In existing flash read cache approaches, incoming data is first written onto the controller cache. When the cache is full, the data is flushed onto the fixed drive volumes (i.e., HDD volumes). The data to be written into the flash volume is read from the fixed drive volume. The data is then written onto the flash volume. The corresponding bitmap in the metadata is updated to indicate that the LBAs are present. When the read operation is performed on the same LBAs again, the controller checks if the data is present in the cache. If present, a read command is acknowledged. The data is then read from the flash drive and sent to the host. Since a read from flash is faster than ordinary fixed drive, the time to service the request is reduced, thus improving the performance.

During a read operation, if there is a cache miss, two read operations are performed from the fixed volume. First a read is performed from the fixed volume and is served to the host. Second, a read is performed in order to write the corresponding LBAs to the flash volume.

It would be desirable to implement method to improve the performance of read ahead cache process in a storage array by transferring data directly between a fixed drive volume and a flash drive volume.

SUMMARY OF THE INVENTION

The present invention concerns an apparatus comprising an array controller and a cache. The array controller may be configured to read/write data to a first array of drives of a first drive type in response to one or more input/output requests. The cache may be configured to (i) receive said input/output requests from the array controller, (ii) temporarily store the input/output requests, and (iii) read/write data to a second array of drives of a second drive type in response to the input/output requests. The first array of drives may be configured to copy the data directly to/from the second array of drives during a cache miss condition such that the array controller retrieves the data stored in the first array of drives through the second array of drives without writing the data to the cache.

The objects, features and advantages of the present invention include providing a method to improve the performance of a read ahead cache process in a storage array that may (i) transfer data directly between a fixed drive volume and a flash volume, (ii) reduce and/or eliminate an extra bandwidth used in a write operation to make more bandwidth available to process I/O requests, (iii) reduce and/or eliminate extra write and/or read operations through the controller to increase the I/O performance, (iv) provide additional bandwidth to process more I/O requests, (v) implement as a direct software copy operation between volumes, (vi) be implemented each time there is a cache and flash cache miss, and/or (vii) be cost effective to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Using solid state devices (SSDs) as drives (or volumes) in a secondary cache of a storage system normally improves the performance of the system. Reads from SSD drives are faster when compared to reads from hard disc drives (HDDs). The present invention may eliminate one read and one write operation to a hard disc drive and/or controller for each input/output (I/O) cycle, thus improving the performance of the system.

The present invention performs a read and/or write between an HDD volume and an SSD volume in order to make the data in the volume available. In a write operation, an extra read and/or write may be implemented in order to write the LBAs to the SSD volume. Once the write is performed to the HDD volume, the data is read from the HDD volume and then a write is performed to the SSD volume.

Figure 1:
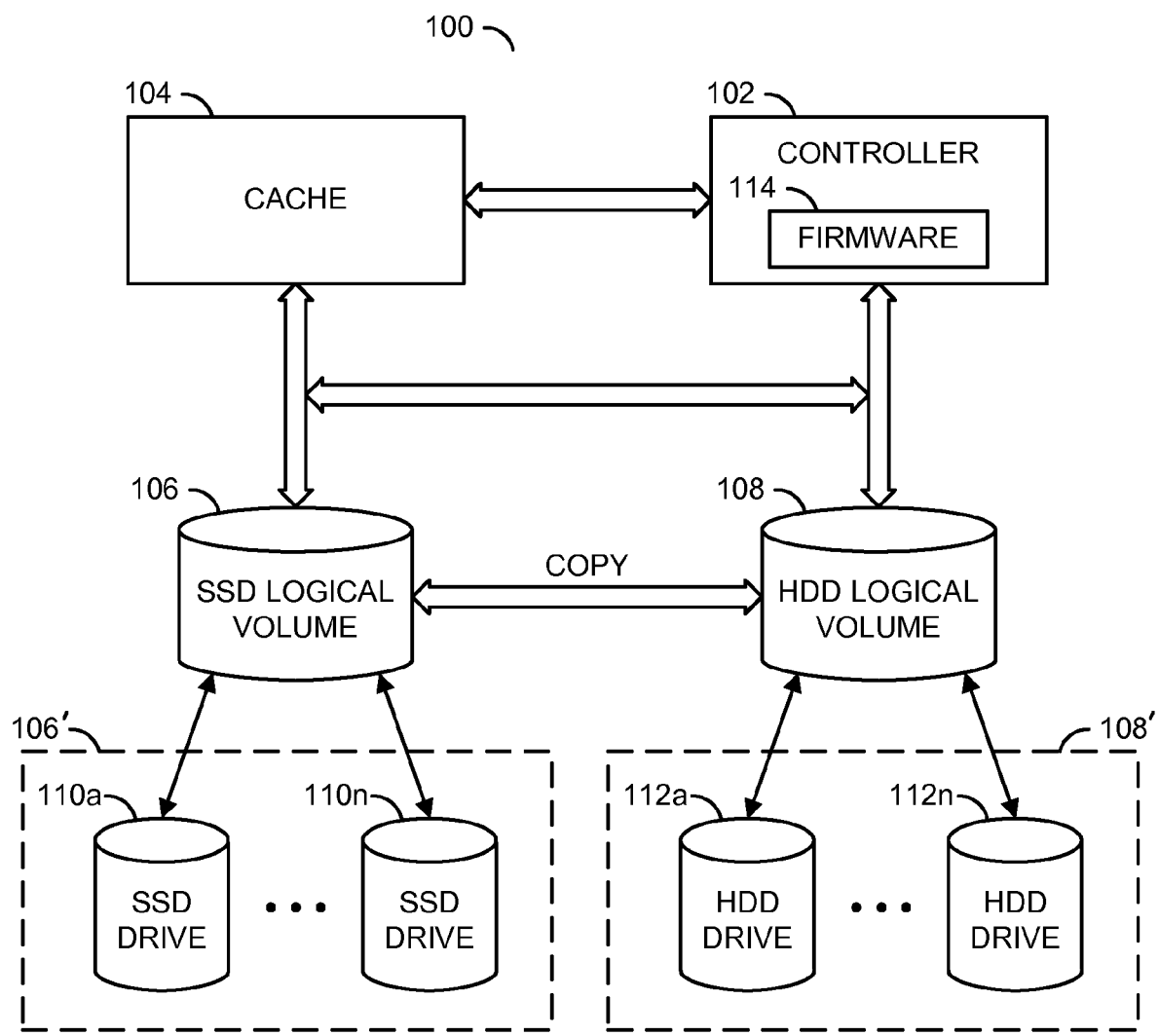
FIG. 1 is a block diagram of an embodiment of the present invention.

Referring to FIG. 1, a block diagram of a system 100 is shown in accordance with an embodiment of the present invention. The system 100 generally comprises a block (or circuit) 102, a block (or circuit) 104, a block (or circuit) 106 and a block (or circuit) 108. The circuit 102 may be implemented as a controller. The circuit 104 may be implemented as a cache. In one example, the circuit 104 may be implemented as a random access memory (RAM) such as a dynamic RAM (DRAM). Other memory types may be implemented to meet the design criteria of a particular implementation. The circuit 104 may be implemented either internally or externally to the controller circuit 102. The circuit 106 may be implemented as a SSD logical volume, the circuit 108 may be implemented as an HDD logical volume. The circuit 106 may include a number of drives 110a-110n. The drives 110a-110n may be implemented as SSD drives. The circuit 108 may be implemented as a number of drives 112a-112n. The drives 112a-112n may be implemented as a number of HDD drives. The controller 102 may include a block (or module) 114. The module 114 may be implemented as firmware (or software, or program instructions, or code) that may control the controller 108.

The system 100 may increase the performance of a storage area network (SAN), network attached storage (NAS) and/or disk array subsystem (DAS) system by eliminating the extra write involved in the existing Flash copy feature. The flash copy may include an SSD volume 106 that may act as a secondary cache as shown in the block diagram. The SSD volume 106 may be created by using the SSD drives 110a-110n in a variety of configurations. A read operation from the SSD drives 110a-110n may be much faster when compared to a read operation from the HDD drives 112a-112n. The system 100 may implement a software copy between the HDD volume 108 and the SSD volume 106. By reducing one or more read and/or write operations, the system 100 may increase the bandwidth needed to process I/O requests. The controller 102, the cache 104, the volume 106 and/or the volume 108 may be implemented as a single array sub-system.

Figure 2:
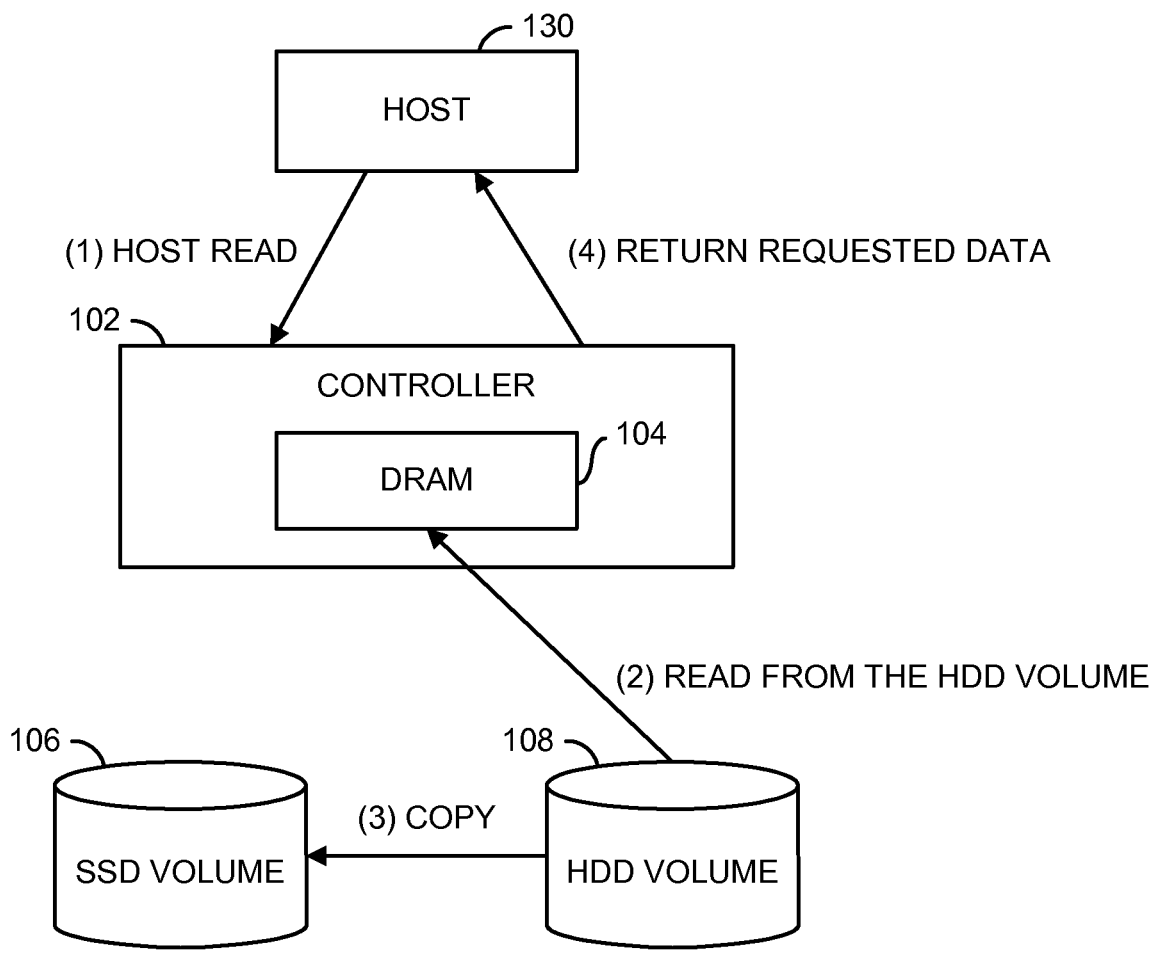
FIG. 2 is a diagram of a host read operation.

Referring to FIG. 2, an example of a proposed read operation is shown. A host 130 is shown connected to the controller 102. In one example, a host read request (e.g., operation 1) may occur where there is a DRAM cache miss and an SSD flash cache miss. Data may be read from the HDD volume 108 (e.g., operation 2). Once the controller 102 reads the LBAs from the HDD volume 108, the same data is copied to the SSD volume 106 using a "software" copy (operation 3) as shown. The corresponding data may be returned to the host 130 (e.g., operation 4). The operations 1-4 represent an example of a sequence of an order the operations may be performed. A software copy may be considered a copy of one or more data blocks between the SSD volume 106 and the HDD volume 108 without writing the data to the memory 104 and/or the controller 102. The software copy may eliminate one or more extra read and/or writes operations processed through the controller 102. The software copy may allow the controller 102 to retrieve data stored in the HDD volume 108 through the SDD volume 106 without writing data to the cache 104. By implementing a direct copy, the gates within the cache 104 (e.g., DRAM, etc.) are not accessed. The software copy may be implemented as a background process within the firmware 114 of the controller 102.

A read from the host 130 after a flash cache miss may need to populate the cache 104. A read operation may be performed to read the LBAs from the HDD volume 108 and a copy operation may be performed to update the SSD volume 106. The bitmap may be updated accordingly to indicate that the set of LBAs are present in the SSD volume 106. Further read operations to the same set LBAs may be directly serviced from the SSD volume 106. This may improve the performance of the system 100.

Figure 3:
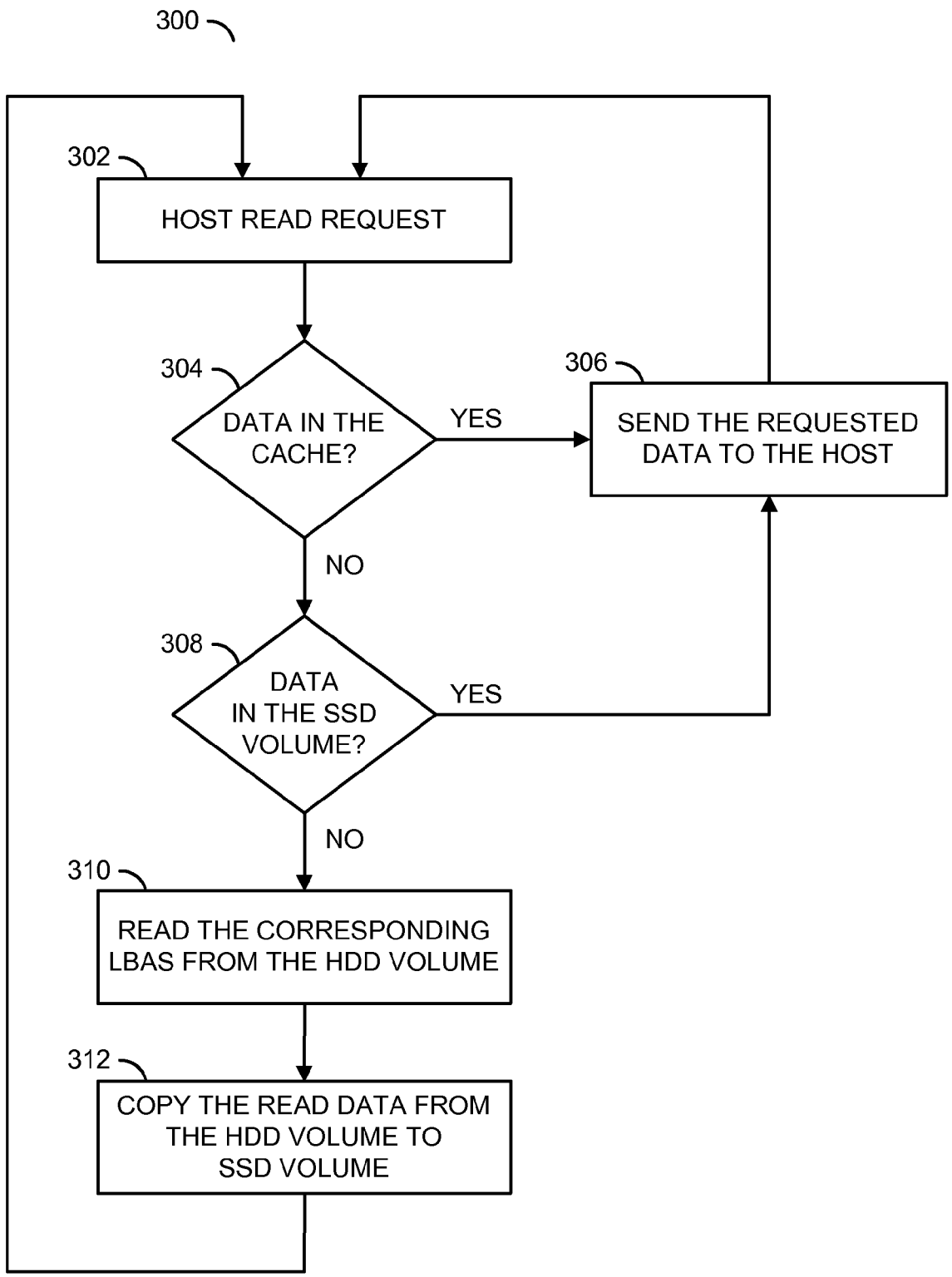
FIG. 3 is a flow diagram of a read operation.

Referring to FIG. 3, a diagram of a flow chart of a method 300 implementing a read operation is shown. The method 300 generally comprises a state (or step) 302, a decision state (or step) 304, a state (or step) 306, a decision state (or step) 308, a step (or state) 310 and a step (or state) 312. The state 302 may initiate a host request. The decision state 304 may determine if data is in the cache 104. If so, the method 300 moves to the state 306. The state 306 may send the requested data to the host 130 and then return to the state 302. If the decision state 304 determines that data is not in the cache 104, the method 300 moves to the decision step 308. The decision step 308 may determine if data is in the SSD volume 106. If so, the method 300 moves to the state 306. If not, the method 300 moves to the state 310. The state 310 reads the corresponding LBAs from the HDD volume 108. Next, the method moves to the state 312 which copies the read data from the HDD volume 108 to the SSD volume 106.

Figure 4:
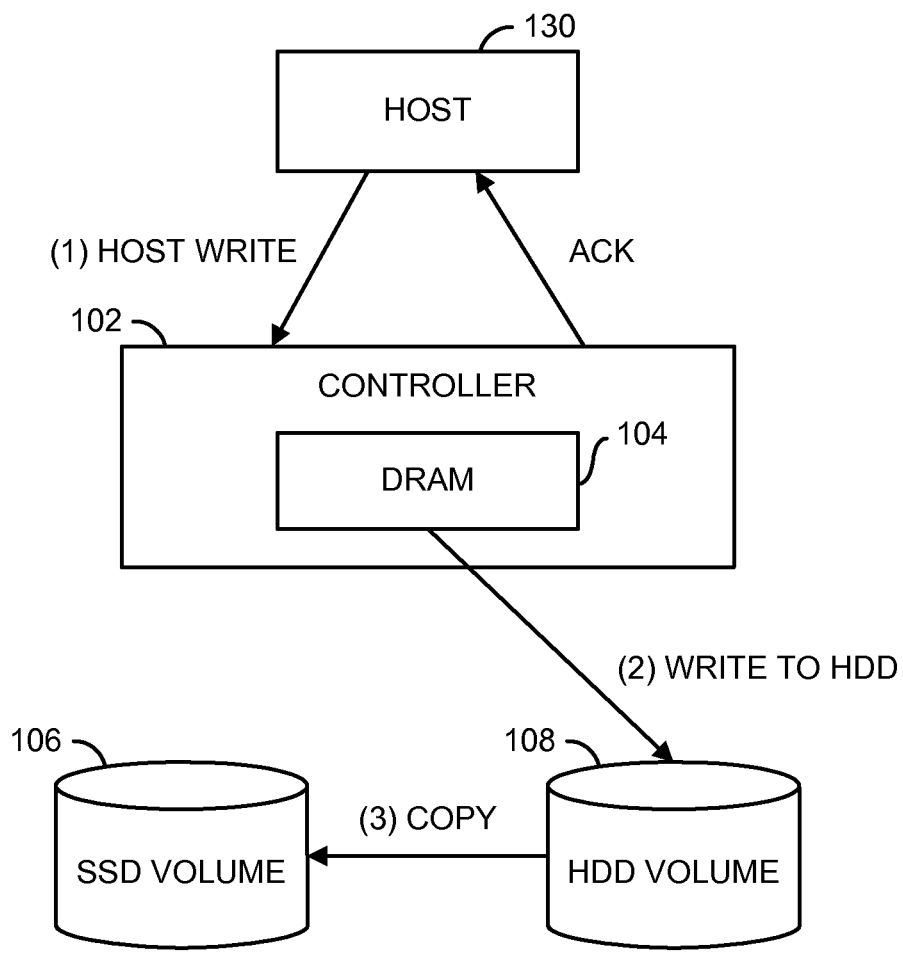
FIG. 4 is a diagram of a write operation.

Referring to FIG. 4, a diagram of a write operation is shown where the host 130 writes to populate the cache 104. When there is a host write request (operation 1), the corresponding data is written on to the HDD volume 108 (operation 2) and a software copy operation is performed to copy the data from the HDD volume 108 to the SSD volume 106 (operation 3). The operations 1-3 represent an example of a sequence of an order the operations may be performed. This may eliminate a read and/or a write operation to the cache circuit 104, which normally increases the I/O performance of the system 100. The write is acknowledged by sending a signal (e.g., ACK) to the host 130.

Figure 5:
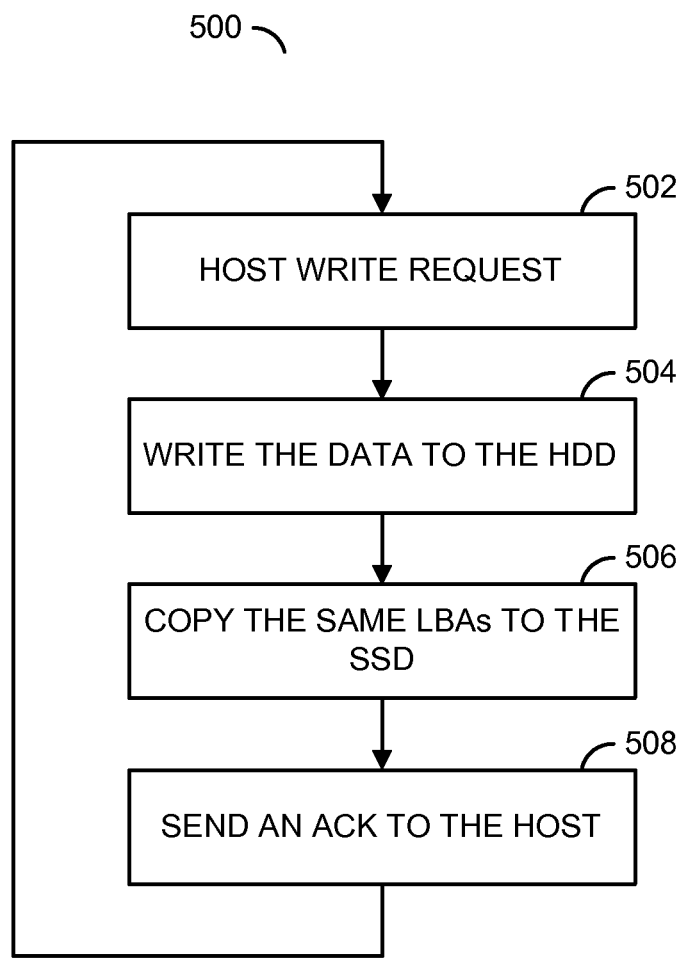
FIG. 5 is a flow diagram of a write operation.

Referring to FIG. 5, a flow diagram of a method 500 implementing a write operation is shown. The method 500 generally comprises a step (or state) 502, a step (or state) 504, a step (or state) 506 and a step (or state) 508. The step 502 may initiate a host write request. The step 504 may write data to the HDD. The step 506 may copy the same LBAs to the SSD. The step 508 may send an acknowledgment to the host.

When there is a host write request (operation 1), the corresponding data is written on to the HDD volume (operation 2) and a software copy operation is performed to copy the data from the HDD volume to the SSD volume (operation 3). This may eliminate both a read and/or a write operation to the cache circuit 104, which may increase the I/O performance of the system 100. The write is acknowledged by sending the signal ACK to the host 130.

The functions performed by the diagrams of FIGS. 3 and 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method for improving performance of read ahead cache in a storage array comprising the steps of:
   reading/writing data to a first array of hard disc drives in response to one or more input/output requests;
   receiving said input/output requests from an array controller in a primary cache on said array controller;
   temporarily storing said input/output requests; and
   reading/writing data to a second array of solid state drives configured as a secondary cache, separate from said array controller, in response to said input/output requests, wherein (A) said first array of hard disc drives is configured to copy said data directly to/from said second array of solid state drives during a cache miss condition such that said data stored in said first array of hard disc drives is retrieved from said second array of solid state drives without writing said data to said primary cache, and (B) wherein said array controller includes a firmware module to control said copy of said data from said first array of hard disc drives to said second array of solid state drives.

2. The method according to claim 1, wherein a number of input/output requests are written to a one or more logical block addresses in the second array of solid state drives.

3. The method according to claim 1, wherein said array controller, said primary cache, said first array of hard disc drives and said second array of solid state drives are configured as a single array sub-system.

4. An apparatus comprising:
   an interface configured to process data in response to one or more input/output requests to/from a drive array;
   a control circuit configured to read/write data to a first array of drives of a first drive type in response to one or more input/output requests; and
   a primary cache on said control circuit configured to (i) receive said input/output requests from said control circuit, (ii) temporarily store said input/output requests, and (iii) read/write data to a second array of drives of a second drive type configured as a secondary cache, separate from said control circuit, in response to said input/output requests, wherein (A) said first array of drives is configured to copy said data directly to/from said second array of drives during a cache miss condition such that said data stored in the first array of drives is retrieved from said second array of drives without writing said data to said primary cache and (B) said copy of said data from said first array of drives to said second array of drives is implemented by a firmware module as a background process;
   wherein at least one of the first array of drives of the first type and the second array of drives of the second type is an array of solid state drive type.

5. The apparatus according to claim 4, wherein said apparatus is configured to reduce and/or eliminate extra write and/or read operations through the array controller to increase I/O performance.

6. The apparatus according to claim 4, wherein said apparatus is configured to provide additional bandwidth to process more I/O requests.

7. An apparatus comprising:
   an array controller configured to read/write data to a first array of magnetic storage drives in response to one or more input/output requests; and
   a primary cache on said array controller configured to (i) receive said input/output requests from said array controller, (ii) temporarily store said input/output requests, and (iii) read/write data to a second array of solid state drives configured as a secondary cache, separate from said array controller, in response to said input/output requests, wherein (A) said first array of magnetic storage drives is configured to copy said data directly to/from said second array of solid state drives during a cache miss condition such that said data stored in the first array of magnetic storage drives is retrieved from said second array of solid state drives without writing said data to said primary cache, and (B) wherein said array controller includes a firmware module to control said copy of said data from said first array of magnetic storage drives to said second array of solid state drives.

8. The apparatus according to claim 7, wherein said cache miss condition occurs when said data is not stored in said primary cache and not stored in said second array of solid state drives.

9. The apparatus according to claim 7, wherein each of said magnetic storage drives comprises a hard disc drive.

10. The apparatus according to claim 7, wherein said array controller, said primary cache, said first array of magnetic storage drives and said second array of solid state drives are configured as a single array sub-system.

11. The apparatus according to claim 7, wherein said apparatus is configured to reduce and/or eliminate extra write and/or read operations through the array controller to increase I/O performance.

12. The apparatus according to claim 7, wherein said apparatus is configured to provide additional bandwidth to process more I/O requests.

13. The apparatus according to claim 7, wherein said firmware module is configured to be implemented each time said cache miss condition occurs.

14. The apparatus according to claim 7, wherein a number of input/output requests are written to a one or more logical block addresses in the second array of solid state drives.

15. The apparatus according to claim 7, wherein said firmware module implements said copy of said data from said first array of magnetic storage drives to said second array of solid state drives as a background process.

16. The apparatus according to claim 7, wherein said copy of said data from said first array of drives to said second array of solid state drives comprises data stored in one or more logical block addresses from said first array of magnetic storage drives corresponding to said input/output requests.

17. The apparatus according to claim 7, wherein said copy of said data from said first array of magnetic storage drives to said second array of solid state drives is a direct software copy.

18. The apparatus according to claim 7, wherein said apparatus increases performance of a storage network (SAN), network attached storage (NAS) and a disk array subsystem (DAS).

19. The apparatus according to claim 7, wherein a bitmap is updated to indicate which logical block addresses are present in the second array of solid state drives.

20. The apparatus according to claim 7, wherein a write operation is acknowledged by sending a signal to a host initiating said write operation.

* * * * *